United States Patent [19]
Rodgers et al.

[11] Patent Number: 5,262,213
[45] Date of Patent: Nov. 16, 1993

[54] STYRENE-BUTADIENE RUBBER FOR TRUCK TIRES

[75] Inventors: Michael B. Rodgers, Akron; Adel F. Halasa, Bath; Wen-Liang Hsu, Copley; Barry A. Matrana, Akron; Stanley M. Mezynski, Mogadore, all of Ohio

[73] Assignee: The Goodyear Tire & Rubber Company, Akron, Ohio

[21] Appl. No.: 944,573

[22] Filed: Sep. 14, 1992

[51] Int. Cl.$^5$ .............. B60C 5/01; C08L 53/02; C08F 293/00
[52] U.S. Cl. .................... 428/36.8; 428/492; 525/95; 525/98; 525/99; 525/314; 526/335; 526/340; 152/450
[58] Field of Search ............ 525/271, 272, 314, 95, 525/98, 99; 152/450; 526/335, 340; 428/492, 36.8

[56] References Cited

U.S. PATENT DOCUMENTS

| | | | |
|---|---|---|---|
| 4,843,120 | 6/1989 | Halasa et al. | 525/237 |
| 4,845,165 | 7/1989 | Halasa et al. | 526/78 |
| 5,047,483 | 9/1991 | Halasa et al. | 525/237 |
| 5,070,148 | 12/1991 | Hsu et al. | 525/316 |
| 5,137,998 | 8/1992 | Hsu et al. | 526/174 |

*Primary Examiner*—James J. Seidleck
*Assistant Examiner*—W. R. M. Clark
*Attorney, Agent, or Firm*—Alvin T. Rockhill

[57] ABSTRACT

The subject invention discloses a styrene-butadiene rubber (SBR) which is particularly valuable for use in making truck tire treads, said rubber being comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, wherein from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a glass transition temperature which is within the range of about $-85°$ C. to about $-70°$ C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

21 Claims, No Drawings

STYRENE-BUTADIENE RUBBER FOR TRUCK TIRES

BACKGROUND OF THE INVENTION

Fuel expenses are one of the major costs encountered by the trucking industry. In recent years, many modifications have been implemented which make trucks more energy efficient. For instance, better fuel efficiency is being attained by implementing more aerodynamic designs which offer a lower coefficient of drag. Improved fuel efficiency can also be attained by designing tires which display less rolling resistance.

In order to reduce the rolling resistance of a tire, rubbers having a high rebound can be utilized in making the tires' treads. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about $-110°$ C. to $-20°$ C. and exhibit a second glass transition temperature which is within the range of about $-50°$ C. to $0°$ C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between $-110°$ C. and $-20°$ C. and subsequently continuing said polymerization in a second reaction zone at a temperature and under conditions sufficient to produce a second polymeric segment having a glass transition temperature which is between $-20°$ C. and $20°$ C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about $40°$ C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about $-10°$ C. to about $-40°$ C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

SUMMARY OF THE INVENTION

It has been unexpectedly found that the rolling resistance and tread wear characteristics of truck tires can be significantly improved by incorporating the styrene-butadiene rubber (SBR) of this invention into the treads thereof. More importantly, this improvement in rolling resistance and tread wear characteristics can be achieved without sacrificing wet traction and wet skid resistance. Truck tires made utilizing this specific SBR in the treads thereof also display a resistance to stone cutting which is at least as good as that observed in conventional truck tires.

The subject invention more specifically discloses a styrene-butadiene rubber which is particularly valuable for use in making truck tire treads, said rubber being comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a glass transition temperature which is within the range of about $-85°$ C. to about $-70°$ C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

The subject invention further discloses a pneumatic truck tire having an outer circumferential tread wherein said tread is a sulfur cured rubber composition comprised of, based on 100 parts by weight of rubber, (a) from about 35 to about 65 parts of a styrene-butadiene rubber comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, wherein from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a glass transition temperature which is within the range of about −85° C. to about −70° C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5; and (b) from about 35 to about 65 parts of natural rubber.

The subject invention also reveals a pneumatic truck tire having an outer circumferential tread wherein said tread is a sulfur cured rubber composition comprised of, based on 100 parts by weight of rubber, (a) from about 50 to about 70 parts of a styrene-butadiene rubber comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, wherein from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a glass transition temperature which is within the range of about −85° C. to about −70° C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5; and (b) from about 15 to about 45 parts of natural rubber; and (c) from about 2 to about 20 parts of high cis-1,4-polybutadiene.

The SBR of this invention is prepared by solution polymerizations utilizing an organolithium initiator. The process used in synthesizing this SBR is conducted as a continuous process which is carried out at a temperature which is within the range of about 75° C. to about 150° C. It has been unexpectedly found that gel build-up can be inhibited by conducting such polymerizations in the presence of 1,2-butadiene and N,N,N',N'-tetramethylethylenediamine.

This invention more specifically reveals a process for preparing a styrene-butadiene rubber which is particularly valuable for use in making truck tire treads which comprises the steps of (1) continuously solution copolymerizing in an organic solvent from about 10 weight percent to about 20 weight percent styrene from about 80 weight percent to about 90 weight percent 1,3-butadiene, based on total monomers, to a conversion which is in the range of about 60% to 100% to produce a living intermediate polymer, wherein the copolymerization is initiated with an organolithium compound, wherein the copolymerization is conducted in the presence of 10 ppm to 500 ppm of 1,2-butadiene, and wherein the copolymerization is conducted in the presence of N,N,N',N'-tetramethylethylenediamine at a molar ratio of N,N,N',N'-tetramethylethylenediamine to the organolithium compound which is within the range of about 0.01:1 to about 0.2:1, and wherein the copolymerization is conducted at a temperature which is within the range of about 75° C. to about 150° C.; (2) partially coupling the living intermediate polymer with a coupling agent selected from the group consisting of divinyl benzene, tin tetrachloride and silicon tetrachloride, wherein the molar ratio of the organolithium compound to the coupling agent is within the range of about 6:1 to about 20:1; (3) allowing the copolymerization to continue so as to produce the styrene-butadiene rubber; and recovering the styrene-butadiene rubber from the organic solvent.

DETAILED DESCRIPTION OF THE INVENTION

The SBR of this invention is synthesized by solution polymerization. Such solution polymerizations will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the polymerizations of this invention will typically contain from about 10 weight percent to about 20 weight percent styrene and from about 80 weight percent to about 90 weight percent 1,3-butadiene monomer. It is typically preferred for the monomer charge composition to contain from about 16 weight percent to about 19 weight percent styrene and from about 81 weight percent to about 84 weight percent 1,3-butadiene. It is generally more preferred for the monomer charge composition to include about 18 weight percent styrene and about 82 weight percent 1,3-butadiene.

The SBR of this invention is synthesized on a continuous basis. In this continuous process, the monomers and an organolithium initiator are continuously fed into a reaction vessel. The pressure in the reaction vessel is typically sufficient to maintain a substantially liquid phase under the conditions of the polymerization reaction. The reaction medium will generally be maintained at a temperature which is within the range of about 75°

C. to about 150° C. throughout the copolymerization. This is generally preferred for the copolymerization to be conducted at a temperature which is within the range of about 80° C. to about 120° C. It is typically more preferred for the copolymerization to be conducted at a temperature which is within the range of about 90° C. to about 100° C.

The organolithium compounds which can be utilized as initiators in the copolymerizations of this invention include organomonolithium compounds and organomonofunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred are alkyllithium compounds which can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butyl-phenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The amount of organolithium initiator employed will be dependent upon the molecular weight which is desired for the SBR being synthesized. An amount of organolithium initiator will be selected to result in the production of SBR having a number average molecular weight which is within the range of about 150,000 to about 400,000 and a weight average molecular weight which is within the range of about 300,000 to about 800,000. The amount of organolithium initiator will preferably be selected to result in the production of a SBR having a number average molecular weight which is within the range of about 250,000 to 300,000 and a weight average molecular weight which is within the range of about 500,000 to about 600,000.

As a general rule in all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is important to carry out such polymerizations in the presence of 1,2-butadiene and N,N,N',N'-tetramethylethylenediamine (TMEDA). For this reason 1,2-butadiene and TMEDA will also be continuously fed into the reaction vessel utilized. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm. The TMEDA will typically be present at a molar ratio of TMEDA to the organolithium compound which is within the range of about 0.01:1 to about 0.2:1. A molar ratio of TMEDA to the organolithium initiator of greater than about 0.2:1 should not be exceeded because the TMEDA acts as a polymerization modifier and increases the glass transition temperature of the SBR produced.

To keep the glass transition temperature of the SBR within the desired range of about −85° C. to about −70° C., the amount of TMEDA employed should be the minimum amount required to inhibit gelation. A molar ratio of TMEDA to the organolithium compound of greater than about 0.2:1 will typically not be exceeded because such high ratios of TMEDA to the organolithium compound can result in the SBR produced having a glass transition temperature of greater than −70° C. As a general rule, a molar ratio of TMEDA to the organolithium compound which is within the range of about 0.05:1 to about 0.15:1 will be employed. It is typically more preferred for the molar ratio of TMEDA to the organolithium compound to be within the range of about 0.08:1 to about 0.12:1.

After a monomer conversion of about 70% to about 100% is achieved, the living intermediate polymer is partially coupled with divinyl benzene, tin tetrachloride or silicon tetrachloride. This is typically done in a second reaction vessel. For instance, the living intermediate polymer can be pumped from a first reaction vessel to a second reaction vessel where the coupling agent is added to the polymerization medium. The coupling agent is preferably added after a monomer conversion of 72% to 90% has been attained and is more preferably added after a monomer conversion of 75% to 85% has been attained.

The coupling agent is added at a level which is sufficient to jump the molecular weight of the polymer to the desired degree without killing all of the living intermediate polymer chains. In the absence of coupling agents, all of the polymer chains can grow to completion (but no molecular weight jumping can occur). At a molar ratio of organolithium initiator to coupling agent of 4 or greater, complete coupling is possible, but because the coupling is by termination, further polymerization and higher levels of conversion cannot be attained. The optimum level is, of course, between these two extremes. As a general rule, the molar ratio of organolithium compound to the coupling agent will be within the range of about 6:1 to about 20:1. Molar ratios of the organolithium compound to the coupling agent which are within the range of about 8:1 to about 12:1 are preferred because they induce sufficient coupling to achieve the desired increased in molecular weight while leaving an adequate number of living chains to attain acceptable conversion levels. Since there are fewer living chains after the coupling, those that are still living attain a higher molecular weight than would otherwise have been achieved had the coupling agent not been employed.

Since the living intermediate polymer is only partially coupled, living polymer chains still exist after the coupling step. In the third step of the process of this invention, the copolymerization is allowed to continue with the still living polymer chains increasing in molecular weight as the copolymerization continues. The copolymerization is allowed to continue in this step until a conversion in excess of about 95 percent is attained. It is preferred for the conversion to be in excess of about 98 percent with essentially quantitative conversions of greater than about 99 percent preferably being reached.

The SBR produced is then recovered from the organic solvent. The SBR can be recovered from the organic solvent by standard techniques, such as decantation, filtration, centrification and the like. It is often desirable to precipitate the SBR from the organic solvent by the addition of lower alcohols containing from 1 to about 4 carbon atoms to the polymer solution. Suitable lower alcohols for precipitation of the SBR from the polymer cement include methanol, ethanol, isopropyl alcohol, n-propyl alcohol and t-butyl alcohol. The utilization of lower alcohols to precipitate the SBR from the polymer cement also "kills" the living SBR chains by inactivating lithium end groups. After the SBR is recovered from the organic solvent, steam stripping can be employed to reduce the level of volatile organic compounds in the rubber.

The SBR made by the process of this invention is characterized by being comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, wherein from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a glass transition temperature which is within the range of about −85° C. to about −70° C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5.

The repeat units in the SBR will preferably be derived from about 16 weight percent to about 19 weight percent styrene and from about 81 weight percent to about 84 weight percent 1,3-butadiene. The repeat units in the SBR will most preferably be comprised of repeat units which are derived from about 18 weight percent styrene and about 82 weight percent 1,3-butadiene. These repeat units which are derived from styrene or 1,3-butadiene differ from the monomer from which they were derived in that a double bond was consumed by the polymerization reaction.

The repeat units derived from styrene and 1,3-butadiene in the SBR have a sequence distribution which is critical to obtain the desired characteristics when used in making truck tire treads. It has been determined that over 55% of the styrene in the SBR is present in blocks of only one styrene repeat unit. Over 75% of the repeat units in the SBR which are derived from styrene are in blocks of one or two repeat units. Over 80% of the styrene in the SBR is present in blocks of three or less repeat units. Over 85% of the styrene present in the SBR is present in blocks of four or less repeat units. Over 90% of the styrene present in the SBR is present in blocks of five or less repeat units. Over 92% of the styrene present in the SBR is in blocks of six or less repeat units. Over 93% of the styrene present in the SBR is in blocks of 7 or less repeat units. Over 94% of the styrene present in the SBR is in blocks of 8 or less repeat units. However, over 5% of the styrene present is in blocks of more than 8 repeat units.

Preferably, from about 34% to about 38% of the repeat units derived from the 1,3-butadiene are of the cis-microstructure. Preferably, from about 53% to about 57% of the repeat units derived from the 1,3-butadiene are of the trans-microstructure. Preferably, from about 7% to about 12% of the repeat units derived from the 1,3-butadiene are of the vinyl-microstructure. It is preferred for the SBR to have a glass transition temperature which is within the range of about −80° C. to about −75° C.

The SBR will preferably have a number average molecular weight which is within the range of about 250,000 to about 300,000. It is preferred for the SBR to have a weight average molecular weight which is within the range of about 500,000 to about 600,000. It is preferred for the SBR to have an inhomogeneity (u) which is within the range of about 0.8 to 1.2. Inhomogeneity is defined by the equation:

$$u = \frac{\text{weight average molecular weight}}{\text{number average molecular weight}} - 1$$

In other words, the ratio of the weight average molecular weight of the SBR to its number average molecular weight is preferably 2:1.

For purposes of this patent application, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

The SBR of this invention is particularly valuable for use in making truck tires which display less rolling resistance and are, accordingly, more energy efficient. The SBR is blended with natural rubbers and, optionally, high cis 1,4-polybutadiene in making tread compounds. One such tread compound is comprised of, based on 100 parts by weight of rubber, (a) from about 35 parts to about 65 parts of the SBR and (b) from about 35 parts to about 65 parts of natural rubber. It is preferred for this tread compound to contain from about 45 parts to about 55 parts of the SBR and from about 45 parts to about 55 parts of natural rubber. Another highly preferred blend for utilization in making truck tires is comprised of, based on 100 parts by weight of rubber, (a) 50 parts to 70 parts of the SBR, (b) from about 15 parts to about 45 parts of natural rubber, and (c) from about 2 parts to about 20 parts of high cis 1,4-polybutadiene. It is preferred for this rubber blend to contain from about 55 parts to about 65 parts of the SBR, from about 5 parts to about 15 parts of the high cis 1,4-polybutadiene, and from about 25 parts to about 40 parts of natural rubber. The high cis 1,4-polybutadiene utilized in such blends typically has a microstructure wherein at least 80% of the butadiene repeat units are cis 1,4-isomeric units. In most cases, the high cis 1,4-polybutadiene will contain at least about 90% cis 1,4-isomeric butadiene units. The high cis 1,4-polybutadiene can be prepared by solution polymerization utilizing a catalyst consisting of (1) an organoaluminum compound, (2) an organonickel compound, and (3) a hydrogen fluoride complex as described in U.S. Pat. No. 3,856,764.

These SBR containing blends can be compounded utilizing conventional ingredients and standard techniques. For instance, the SBR containing blends will typically be blended with carbon black, sulfur, fillers, accelerators, oils, waxes, scorch inhibiting agents, and processing aids. In most cases, the SBR containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The SBR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The SBR containing rubber blends of this invention can be used in tire treads in conjunction with ordinary tire manufacturing techniques. Tires are built utilizing standard procedures with the SBR simply being substituted for the rubber compounds typically used as the tread rubber. After the tire has been built with the SBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

The SBR prepared in this experiment was synthesized in a two-reactor (10 liters each) continuous system at 95° C. A premix containing styrene and 1,3-butadiene in hexane was charged into the first polymerization reactor continuously at a rate of 65.6 grams/minute. The premix monomer solution contained a ratio of styrene to 1,3-butadiene of 18:82 and the total monomer concentration was 14%. Polymerization was initiated by adding a 0.128M solution of n-butyllithium into the first reactor at a rate of 0.4 grams/minute. A small amount (0.08 phm, or grams per hundred grams of monomer) of N,N,N',N'-tetramethylethylenediamine (TMEDA) was used as the styrene randomizer and gel preventer, and divinylbenzene (DVB; 0.015 phm) was used as a coupling/branching agent. TMEDA was added to the first reactor continuously. The residence time for both reactors was set at two hours. DVB was continuously added to the second reactor as a gel inhibitor. Essentially the complete monomer conversions were obtained in the second reactor. The polymerization medium was then continuously pushed over to a holding tank containing the shortstop (methanol) and an antioxidant. The resulting polymer cement was then steam stripped and the recovered SBR was dried in a vacuum oven at 60° C.

The repeat units derived from styrene had a sequence distribution wherein about 60% of the styrene was in blocks of only 1 unit, wherein about 18% of the styrene was in blocks of 2 units, wherein about 6% of the styrene was in blocks of 3 units, wherein about 5% of the styrene was in blocks of 4 units, wherein about 2% of the styrene was in blocks of 5 units, wherein about 1.5% of the styrene was in blocks of 6 units, wherein about 1% of the styrene was in blocks of 7 units, wherein about 1% of the styrene was in blocks of 8 units, and wherein about 5.5% of the styrene was in blocks of more than 8 units. The polymer was determined to have a glass transition temperature at −75° C. and have a Mooney ML-4 viscosity of 85. It was also determined to have a microstructure which contained 18% styrene units, 30 cis 1,4-polybutadiene units, 45% trans 1,4-polybutadiene units and 7% 1,2-polybutadiene units.

The solution SBR was compounded in a radial truck tread compound consisting of a 50/50 blend with natural rubber, carbon black, antioxidants, sulfur and a semi-EV vulcanization system. The compound properties were then compared to a natural rubber/polybutadiene blend. The compound physical properties are listed in Table I. Tire test data for the same compounds are presented in Table II.

The tread compounds were built into size 11R24.5 heavy duty radial truck tires with a lug tread pattern. The tires were then tested for tread wear in highway service, fast wearing conditions which simulate truck city service, traction performance, and tire rolling resistance. Use of the solution SBR, described in this disclosure, in a heavy duty truck tire enables:

(1) 29% improvement in tread wear performance in highway service;
(2) 7% reduction in rolling resistance which in turn results in improved vehicle fuel economy;
(3) up to 8% improvement in city type tread wear performance;
(4) maintenance in tire wet skid, and wet traction performance.

It should be noted that use of traditional polymers does not allow improvements in both tire rolling resistance performance and wet handling characteristics.

TABLE I

| Tire Tread Compound Physical Properties | | |
|---|---|---|
| Compound | 1 | 2 |
| Natural Rubber | 50 | 50 |
| Medium Cis-1,4-Polybutadiene | 50 | — |
| SBR | — | 50 |
| Tensile Strength (MPa) | 19.71 | 19.63 |
| Elongation (%) | 435 | 410 |
| 300% Modulus (MPa) | 12.31 | 13.36 |
| Rebound (%) at 0° C. | 40 | 42 |
| Rebound (%) at 60° C. | 65 | 71 |
| Tan Delta at 0° C. | 0.125 | 0.123 |
| Tan Delta at 60° C. | 0.098 | 0.820 |

TABLE II

| Tire Tread Compound Performance | | |
|---|---|---|
| Compound | 1 | 2 |
| Natural Rubber | 50 | 50 |
| Medium Cis-1,4-Polybutadiene | 50 | — |
| SBR | — | 50 |
| Tire Running Temperature (Rating 1) | 100 | 106 |
| Rolling Resistance (2) | 100 | 111 |
| Wet Skid Resistance | 100 | 100 |
| Wet Traction | 100 | 105 |
| Global Tread Wear (3) (Highway Service at 60,000 miles) | 100 | 129 |
| Evenness of Wear (4) | 100 | 106 |
| Fast Tread Wear (5) | 100 | 108 |
| Damage Resistance (6) | 100 | 100 |

(1) Tire running temperature is the tread temperature measured while the tire is at 35 mph with an infra-red pyrometer. A higher rating is a lower temperature and is better.
(2) Rolling resistance or tire drag rating (higher is better).
(3) Global tread wear is the remaining tire tread non-skid after sixty thousand miles of service on instate highway.
(4) Evenness of wear is the standard deviation of the tread non-skid measurements expressed as a rating (higher is better).
(5) Fast tread wear performance is the rate of wear under abrasive conditions. Higher ratings are better.
(6) Damage resistance is a measure of the resistance to chipping, chunking, and cutting after running for 8,000 miles on a gravel road.

While certain representative embodiments and details have been shown for the purpose of illustrating the subject invention, it will be apparent to those skilled in this art that various changes and modifications can be made therein without departing from the scope of the subject invention.

What is claimed is:

1. A styrene-butadiene rubber which is particularly valuable for use in making truck tire treads, said rubber being comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, wherein from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a single glass transition temperature which is within the range of about −85° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

2. A styrene-butadiene rubber as specified in claim 1 wherein the repeat units in the rubber are derived from about 16 weight percent to about 19 weight percent styrene and from about 81 weight percent to about 84 weight percent butadiene.

3. A styrene-butadiene rubber as specified in claim 2 wherein at least 80% of the repeat units in the rubber which are derived from styrene are in blocks of three or less repeat units.

4. A styrene-butadiene rubber as specified in claim 3 wherein from about 34 percent to about 38 percent of the repeat units derived from the 1,3-butadiene are of the cis-microstructure, wherein from about 53 to about 57 percent of the repeat units derived from the 1,3-butadiene are of the trans-microstructure, and wherein from about 7 percent to about 12 percent of the repeat units derived from the 1,3-butadiene are of the vinyl-microstructure.

5. A styrene-butadiene rubber as specified in claim 4 wherein said rubber has a number average molecular weight which is within the range of about 250,000 to about 300,000 and wherein said rubber has a weight average molecular weight which is within the range of about 500,000 to about 600,000.

6. A styrene-butadiene rubber as specified in claim 5 wherein said rubber has an inhomogeneity which is within the range of about 0.8 to about 1.2.

7. A styrene-butadiene rubber as specified in claim 6 wherein the repeat units in said rubber are derived from about 18 weight percent styrene and about 82 weight percent 1,3-butadiene.

8. A styrene-butadiene rubber as specified in claim 6 wherein said rubber has a glass transition temperature which is within the range of about −80° C. to about −75° C.

9. A pneumatic truck tire having an outer circumferential tread wherein said tread is a sulfur cured rubber composition comprised of, based on 100 parts by weight of rubber, (a) from about 35 to about 65 parts of a styrene-butadiene rubber comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, wherein from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a single glass transition temperature which is within the range of −85° C. to about −70° C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5; and (b) from about 35 to about 65 parts of natural rubber.

10. A pneumatic truck tire as specified in claim 9 which is comprised of (a) from about 45 parts to about 55 parts of the styrene-butadiene rubber and (b) from about 45 parts to about 55 parts of natural rubber.

11. A process for preparing a styrene-butadiene rubber which is particularly valuable for use in making truck tire treads which comprises the steps of (1) continuously solution copolymerizing in an organic solvent from about 10 weight percent to about 20 weight percent styrene and from about 80 weight percent to about 90 weight percent 1,3-butadiene, based on total monomers, to a conversion which is in the range of about 60% to about 100% to produce a living intermediate polymer, wherein the copolymerization is initiated with an organolithium compound, wherein the copolymerization is conducted in the presence of 10 ppm to 500 ppm of 1,2-butadiene, and wherein the copolymerization is conducted in the presence of N,N,N',N'-tetramethylethylenediamine at a molar ratio of N,N,N',N'-tetramethylethylenediamine to the organolithium compound which is within the range of about 0.01:1 to about 0.2:1, and wherein the copolymerization is conducted at a temperature which is within the range of about 75° C. to about 150° C.; (2) partially coupling the living intermediate polymer with a coupling agent selected from the group consisting of divinyl benzene, tin tetrachloride and silicon tetrachloride, wherein the molar ratio of the organolithium compound to the coupling agent is within the range of about 6:1 to about 20:1; (3) allowing the copolymerization to continue so as to produce the styrene-butadiene rubber; and recovering the styrene-butadiene rubber from the organic solvent.

12. A process as specified in claim 11 wherein step (1) is carried out in a first reactor and wherein step (2) is carried out in a second reactor.

13. A process as specified in claim 12 wherein the 1,2-butadiene is present at a level which is within the range of about ppm to about 300 ppm.

14. A process as specified in claim 13 wherein the molar ratio of N,N,N',N'-tetramethylethylene-diamine to organolithium initiator is within the range of about 0.05:1 to about 0.15:1.

15. A process as specified in claim 14 wherein the molar ratio of the organolithium initiator to the coupling agent is within the range of about 8:1 to about 12:1.

16. A process as specified in claim 15 wherein the 1,2-butadiene is present at a level which is within the range of about 100 ppm to about 200 ppm.

17. A process as specified in claim 12 wherein the organolithium compound is an organomonolithium compound.

18. A process as specified in claim 12 wherein the organolithium compound is an alkyllithium compound which contains from 1 to 10 carbon atoms.

19. A styrene-butadiene rubber as specified in claim 3 wherein at least 90% of the repeat units in the rubber which are derived from styrene are in blocks of 5 or less repeat units.

20. A process as specified in claim 18 wherein said copolymerization is conducted at a temperature which is within the range of about 80° C. to about 120° C.

21. A styrene-butadiene rubber as specified in claim 4 wherein said rubber has a Mooney viscosity ML1+4 within the range of about 70 to about 95.

* * * * *